(12) United States Patent
Boss et al.

(10) Patent No.: US 10,614,471 B2
(45) Date of Patent: *Apr. 7, 2020

(54) TRANSFORMING SOCIAL MEDIA RE-SHARES TO TRACK REFERRER HISTORY AND IDENTIFY INFLUENCERS

(71) Applicant: INTERNATIONAL BUSINESS MACHINES CORPORATION, Armonk, NY (US)

(72) Inventors: Gregory J. Boss, Saginaw, MI (US); Rick A. Hamilton, II, Charlottesville, VA (US); Luis C. Cruz Huertas, San Pedro (CR); Edgar A. Zamora Duran, Santo Domingo (CR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 73 days.

This patent is subject to a terminal disclaimer.

(21) Appl. No.: 15/908,023

(22) Filed: Feb. 28, 2018

(65) Prior Publication Data

US 2018/0189807 A1 Jul. 5, 2018

Related U.S. Application Data

(63) Continuation of application No. 14/671,539, filed on Mar. 27, 2015, now Pat. No. 9,996,846.

(51) Int. Cl.
*G06Q 30/02* (2012.01)
*G06Q 50/00* (2012.01)

(52) U.S. Cl.
CPC ......... *G06Q 30/0201* (2013.01); *G06Q 50/01* (2013.01)

(58) Field of Classification Search
CPC ........................................ G06Q 10/00–50/00
(Continued)

(56) References Cited

U.S. PATENT DOCUMENTS

| 5,712,979 A | 1/1998 | Graber et al. |
| 6,029,141 A | 2/2000 | Bezos et al. |

(Continued)

FOREIGN PATENT DOCUMENTS

| CN | 101324948 | 12/2008 |
| CN | 102096701 | 6/2011 |

(Continued)

OTHER PUBLICATIONS

Chinese Office Action dated Dec. 4, 2018 in related Application No. 201610179806.0, 7 pages.

(Continued)

*Primary Examiner* — Alan S Miller
(74) *Attorney, Agent, or Firm* — Brian M. Restauro; Andrew M. Calderon; Roberts Mlotkowski Safran Cole & Calderon, P.C.

(57) ABSTRACT

Approaches are provided for tracking and measuring the influence of social networking members on groups of friends to engage in electronic commerce. An approach includes receiving unique identifier information and activity information for a user that referred a social media link to one or more other users. The approach further includes generating a reference identifier for the referrer of the social media link to the one or more other users. The approach further includes embedding the generated reference identifier into the social media link. The generated reference identifier includes a concatenation of the unique identifier information, the activity information, and information pertaining to referrals of the social media link prior to the referrer to the one or more other users.

14 Claims, 9 Drawing Sheets

(58) Field of Classification Search
USPC .................................................. 705/7.11–7.42
See application file for complete search history.

(56) References Cited

U.S. PATENT DOCUMENTS

| | | | |
|---|---|---|---|
| 6,629,135 B1 | 9/2003 | Ross, Jr. et al. | |
| 7,062,475 B1* | 6/2006 | Szabo | G06Q 30/02 706/11 |
| 7,337,133 B1 | 2/2008 | Bezos et al. | |
| 7,853,474 B2* | 12/2010 | Ullah | G06Q 30/02 705/14.4 |
| 7,912,751 B1* | 3/2011 | Allos | G06Q 30/02 705/1.1 |
| 7,941,525 B1 | 5/2011 | Yavilevich | |
| 8,180,680 B2* | 5/2012 | Leventhal | G06Q 30/02 705/26.1 |
| 8,306,874 B2* | 11/2012 | Morgenstern | G06Q 30/00 705/26.1 |
| 8,473,437 B2 | 6/2013 | Zaman et al. | |
| 8,577,993 B2 | 11/2013 | Gao et al. | |
| 8,700,618 B2* | 4/2014 | Evans | G06F 16/9566 707/726 |
| 8,739,016 B1 | 5/2014 | Goldman et al. | |
| 8,762,206 B2* | 6/2014 | Morgenstern | G06Q 30/02 705/14.73 |
| 8,775,320 B1* | 7/2014 | Lindeman | G06F 21/10 705/51 |
| 9,076,178 B2* | 7/2015 | Benzon | G06Q 30/0631 |
| 9,413,557 B2* | 8/2016 | Herbrich | G06Q 30/0214 |
| 10,013,695 B2* | 7/2018 | Messer | G06Q 30/02 |
| 2001/0020231 A1* | 9/2001 | Perri, III | G06Q 30/02 705/14.16 |
| 2001/0037205 A1* | 11/2001 | Joao | G06Q 20/10 705/1.1 |
| 2002/0029290 A1* | 3/2002 | Burema | G06F 11/3476 709/238 |
| 2002/0069116 A1 | 6/2002 | Ohashi et al. | |
| 2002/0078191 A1 | 6/2002 | Lorenz | |
| 2003/0236701 A1 | 12/2003 | Rowney et al. | |
| 2004/0006598 A1* | 1/2004 | Bargagli Damm | G06Q 10/107 709/206 |
| 2006/0212355 A1 | 9/2006 | Teague et al. | |
| 2006/0224729 A1* | 10/2006 | Rowe | G06Q 10/06 709/224 |
| 2006/0293948 A1 | 12/2006 | Weinblatt | |
| 2007/0260605 A1* | 11/2007 | Norman | G06Q 30/02 |
| 2007/0288312 A1 | 12/2007 | Wang | |
| 2008/0154915 A1 | 6/2008 | Flake et al. | |
| 2008/0167946 A1 | 7/2008 | Bezos et al. | |
| 2008/0262920 A1* | 10/2008 | O'Neill | G06Q 30/02 705/14.27 |
| 2009/0119173 A1 | 5/2009 | Parsons et al. | |
| 2009/0132366 A1 | 5/2009 | Lam et al. | |
| 2009/0171760 A1 | 7/2009 | Aamio et al. | |
| 2009/0248516 A1* | 10/2009 | Gross | G06Q 10/10 705/14.66 |
| 2009/0265460 A1* | 10/2009 | Balasubramanian | H04L 43/00 709/224 |
| 2010/0100416 A1 | 4/2010 | Harbrich et al. | |
| 2010/0223119 A1 | 9/2010 | Klish | |
| 2010/0268661 A1 | 10/2010 | Levy et al. | |
| 2010/0318611 A1* | 12/2010 | Curtin | G06F 15/16 709/206 |
| 2010/0324981 A1 | 12/2010 | Etchegoyen | |
| 2011/0153423 A1 | 6/2011 | Elvekrog et al. | |
| 2011/0196725 A1 | 8/2011 | Malcolmson et al. | |
| 2011/0313833 A1* | 12/2011 | Graepel | G06Q 30/0214 705/14.16 |
| 2012/0089446 A1* | 4/2012 | Gupta | G06Q 30/0208 705/14.11 |
| 2012/0089581 A1* | 4/2012 | Gupta | G06Q 10/00 707/706 |
| 2012/0150598 A1 | 6/2012 | Griggs | |
| 2012/0254074 A1 | 10/2012 | Flinn et al. | |
| 2012/0271719 A1 | 10/2012 | Straley et al. | |
| 2012/0324027 A1 | 12/2012 | Vaynblat | |
| 2012/0330701 A1 | 12/2012 | Hyder et al. | |
| 2013/0117364 A1 | 5/2013 | Bania et al. | |
| 2013/0124428 A1 | 5/2013 | Hertz | |
| 2013/0159507 A1 | 6/2013 | Mason et al. | |
| 2013/0197990 A1 | 8/2013 | Velkoski et al. | |
| 2013/0262204 A1 | 10/2013 | Stiles et al. | |
| 2013/0346298 A1 | 12/2013 | Bird et al. | |
| 2014/0006125 A1 | 1/2014 | Meegan | |
| 2015/0281163 A1 | 10/2015 | Bastide et al. | |
| 2015/0294377 A1 | 10/2015 | Chow | |
| 2015/0348078 A1 | 12/2015 | Alsina et al. | |

FOREIGN PATENT DOCUMENTS

| | | |
|---|---|---|
| CN | 102254028 | 11/2011 |
| EP | 2550637 | 1/2013 |
| WO | 2012148924 | 11/2012 |

OTHER PUBLICATIONS

Unknown, http://amby.com/tools/valuepay.html, ValuePay.com., 1999 © Copyright ValuePay.com, Inc., 5 pages.

Unknown, http://www.offerpop.com/products/referral/, "Expand Your Reach and Reward Brand Advocated", Offerpop.com, Copyright © 2014 Offerpop, 3 pages.

Unknown, https://getambassador.com/, "Flexible Software for Referral Programs", Copyright © 2014 Ambassador by Zferral, Inc., 6 pages.

Unknown, "Method for Tracking URL Passing/Rereferencing Flow", http://ip.com/IPCOM/000189448, Nov. 2009, 1 page.

Rayson, "Free Tools to Track the Secrets of Social Shares", http://www.socialmediatoday.com/content/free-tools-track-secrets-social-shares, Sep. 2013, 6 pages.

"List of IBM Patents or Patent Applications Treated as Related" 1 page.

* cited by examiner

| Originator | ID Website/Mobiledevice ID | Reference ID (415) | Transaction ID User (420) | Product Offer ID (425) | Retailer ID (430) | Transaction ID System (435) | Session ID (440) | Element/Recommendation ID (405) |
|---|---|---|---|---|---|---|---|---|
| Sally | www.mystore.com/index.htm/Prod/Mobiledevice/Campaign2 | H84KQ4d | SHARE1001ABC | Mobiledevice12345 | MyStore23LAX | 2001ABC | Est302 | H84KQ4dBC45AXBC02 |
| Tom | https://www.facebook.com/Sally | FB84KQ4d | ORGSHARENA1001BH | Mobiledevice12345 | MyStore23LAX | 2002ABC1 | Est303 | FB84KQ4dHL45AXBC103 |
| Jane | https://plus.google.com/+chkshoes217 | G84KQ4d | ORGSHARENA1001TOM | Mobiledevice12345 | MyStore23LAX | 2003ABC2 | Est304 | G84KQ4dOM45AXBC204 |
| Harry | https://twitter.com/Jane | T84KQ4d | ORGSHARESSS1001JAN | Mobiledevice12345 | MyStore23LAX | 2004ABC3 | Est305 | T84KQ4dAN45AXBC305 |
| Bill | https://www.facebook.com/Harry | FB84KQ4d | TOMSHARENA1001HRL | Mobiledevice12345 | MyStore23LAX | 2005ABC4 | Est306 | FB84KQ4dRL45AXBC406 |
| Emery | https://www.facebook.com/Bill | FB84KQ4d | TOMNANA1001HY | Mobiledevice12345 | MyStore23LAX | 2006ABC5 | Est307 | FB84KQ4dHY45AXBC507 |
| Joseph | https://plus.google.com/+Emery | G84KQ4d | TOMNANA1001ESL | Mobiledevice12345 | MyStore23LAX | 2007ABC6 | Est308 | G84KQ4dSL45AXBC608 |
| Joe | https://twitter.com/Joseph | T84KQ4d | SALSHARENA1001PH | Mobiledevice12345 | MyStore23LAX | 2008ABC7 | Est309 | T84KQ4dPH45AXBC709 |
| Vince | https://plus.google.com/Joe | G84KQ4d | JANNANA1001TG | Mobiledevice12345 | MyStore23LAX | 2009ABC8 | Est310 | G84KQ4dTG45AXBC810 |
| Amber | https://plus.google.com/Vince | G84KQ4d | JANNANA1001VTG | Mobiledevice12345 | MyStore23LAX | 2010ABC9 | Est311 | G84KQ4dTG45AXBC911 |
| Ginger | https://plus.google.com/Amber | G84KQ4d | JANNANA1001AMB | Mobiledevice12345 | MyStore23LAX | 2011ABC10 | Est312 | G84KQ4dMB45AXC10312 |
| Andrew | https://plus.google.com/Ginger | G84KQ4d | HARNANA1001GFT | Mobiledevice12345 | MyStore23LAX | 2012ABC11 | Est313 | G84KQ4dFT45AXC11313 |
| Rick | https://twitter.com/Andrew | T84KQ4d | HARNANA1001AWT | Mobiledevice12345 | MyStore23LAX | 2013ABC12 | Est314 | T84KQ4dWT45AXC12314 |
| Edgar | https://www.facebook.com/Rick | FB84KQ4d | TOMSHARESSS1001RWT | Mobiledevice12345 | MyStore23LAX | 2014ABC13 | Est315 | FB84KQ4dWT45AXC13315 |
| Linda | https://plus.google.com/Edgar | G84KQ4d | JOSNANA1001ESG | Mobiledevice12345 | MyStore23LAX | 2015ABC14 | Est316 | G84KQ4dSG45AXC14316 |
| Gini | https://www.facebook.com/Linda | FB84KQ4d | RICNANA1001LDW | Mobiledevice12345 | MyStore23LAX | 2016ABC15 | Est317 | FB84KQ4dDW45AXC15317 |
| Laura | https://www.facebook.com/Gini | FB84KQ4d | RICNANA1001GJK | Mobiledevice12345 | MyStore23LAX | 2017ABC16 | Est318 | FB84KQ4dJK45AXC16318 |
| Chandler | https://www.facebook.com/Laura | FB84KQ4d | RICNANA1001MH | Mobiledevice12345 | MyStore23LAX | 2018ABC17 | Est319 | FB84KQ4dMH45AXC17319 |
| Owe | https://www.facebook.com/handle | FB84KQ4d | RICSHARESSS1001CDL | Mobiledevice12345 | MyStore23LAX | 2019ABC18 | Est320 | FB84KQ4dDL45AXC18320 |
| Turner | https://www.facebook.com/owe | FB84KQ4d | RICNANA1001UWE | Mobiledevice12345 | MyStore23LAX | 2020ABC19 | Est321 | FB84KQ4dWE45AXC19321 |
|  | https://www.facebook.com/turner | FB84KQ4d | RICNANA1001TAM | Mobiledevice12345 | MyStore23LAX | 2021ABC20 | Est322 | FB84KQ4dAM45AXC20322 |

FIG. 7

| | Recommendation ID | Segmentation | Mapped to Session ID 303 | Mapped to TRX User ID | Reverse Map to |
|---|---|---|---|---|---|
| MY STORE | H84KQ4dBC45AXBC02 | | | | |
| SALLY | FB84KQ4dIL45AXBC103 | C103 | EST303 | ORGSHARE!NA1001SIL | SALSHARE!NA1001JPH, JOSSHARE!SSS1001RWT, JOSNA!NA1001ESG, RICNA!NA1001LDW, RICNA!NA1001IGK, RICNA!NA1001LMH, RICSHARE!SSS1001CDL, RICNA!NA1001UWE, RICNA!NA1001TAM |
| Joseph | T84KQ4dPH45AXBC709 | C709 | EST309 | SALSHARE1001JPHNA | |
| Rick | FB84KQ4dWT45AXC13315 | C13315 | EST315 | JOSSHARE1001RWTSSS | |
| Edgar | G84KQ4dSG45AXC14316 | C14316 | EST316 | JOSNA!NA1001ESG | |
| Linda | FB84KQ4dDW45AXC15317 | C15316 | EST317 | RICNA!NA1001LDW | |
| Gini | FB84KQ4dJK45AXC16318 | C16318 | EST318 | RICNA!NA1001IGK | |
| Laura | FB84KQ4dMH45AXC17319 | C17319 | EST319 | RICNA!NA1001LMH | |
| Chandler | FB84KQ4dDL45AXC18320 | C18320 | EST320 | RICSHARE!SSS1001CDL | |
| Uwe | FB84KQ4dWE45AXC19321 | C19321 | EST321 | RICNA!NA1001UWE | |
| Tanner | FB84KQ4dAM45AXC20322 | C20322 | EST322 | RICNA!NA1001TAM | |

FIG. 8

TRANSFORMING SOCIAL MEDIA RE-SHARES TO TRACK REFERRER HISTORY AND IDENTIFY INFLUENCERS

FIELD OF THE INVENTION

The technical character of the present invention generally relates to electronic commerce, and more particularly, to systems and methods for tracking and measuring the influence of social networking members on groups of friends to engage in electronic commerce.

BACKGROUND

Commercial enterprises rely on marketing campaigns to attract consumers to their products, build consumer rapport, and obtain consumer information for future business decisions. Traditional marketing campaigns typically include advertisements, promotions, and coupons directed to a wide audience in hopes that many members of the audience will use the promotions. However, many marketing campaigns are unsuccessful as potential consumers view the promotions merely as unwanted nuisances. In addition, potential consumers receiving offers often naturally distrust the source of the promotional offers. Gaining this trust is a difficult hurdle for marketers.

Traditional marketing campaigns employ electronic media to distribute electronic promotions (e.g., coupons) of products or service. However, the use of electronic media typically mimics techniques of traditional campaigns, such as by placing banner advertisements in an Internet-based format, resulting in the same difficulties and failures as the more traditional marketing campaigns. For example, electronic promotions can be offered to a potential customer by sending an unsolicited electronic mail to the customer or an electronic coupon can be posted as an advertisement on a webpage. For the example coupon-offering schema, consumers are often hesitant to use the unsolicited coupons and even those seeking coupons would have difficulties finding the appropriate and trustworthy webpage.

Computer-implemented social networks are becoming increasingly popular, especially by young consumers. Social networks generically include a plurality of members, each of whom has a group of friends who are also members of the social network. The social networks allow for the sharing of social and personal information amongst the group of friends. Existing marketing campaigns for social networks typically mimic traditional advertising and promotional campaigns, such as through the use of online banner ads and unsolicited promotional offers. The communal nature of the social network allows for the distribution of promotional offers amongst a group of friends and commonly results in a more economical and effective distribution method for a promotional offer compared to traditional distributed electronic promotions due to each receiver of a promotional offer already having a friend or contact list present and a level of trust already being established between friends within a group. People have had a measure of influence over the purchase of products and services for generations. However, businesses have had very limited success with tacking and measuring the influence of social networking members on groups of friends to engage in electronic commerce.

One approach to overcome this labor intensive process is an automated tracking system that includes product-specific hyperlinks that allows potential customers to link to a merchant's website to initiate purchases of such products from the merchant. Each product-specific hyperlink is provided within a catalog document in association with referral information that is transmitted to the merchant's site when a user (customer) clicks on the product-specific hyperlink. The referral information includes a unique ID of a member and a unique ID of the selected product. Referral processing software running on the merchant site uses the referral information to identify a member associated with the catalog and that referred the customer to the merchant site, and to identify the product selected from the catalog. If the customer subsequently purchases the selected product from the merchant site, the referral processing software automatically credits the referring member for the referral by, for example, applying a commission to an account of the member.

However, such an approach is not capable of tracking subsequent transactions or re-referrals. Instead, such an approach utilizes static product-specific hyperlinks associated with fixed referral information, such as a unique ID of a member and a unique ID of the selected product, in order to track transactions or referrals that originate from a catalog associated with a member. In such an approach, subsequent transactions or re-referrals that result from exposure of the customer to the catalog, product, merchant's Website, etc., are incapable of being tracked and used to measure the influence that the originating member and/or the customer had on any subsequent transaction or re-referral. Tracking and measuring the influence of members in social networks based merely on use of static product-specific hyperlinks provides for an imperfect service, as it fails to take into consideration the influence on subsequent transactions or re-referrals from friends of the member and friends of the those friends. Further, and potentially worse, "high influence" members may not be identified properly for potential targeted advertising opportunities because the influence on subsequent transactions or re-referrals from friends of the member and friends of those friends is not being taken into consideration.

SUMMARY

In a first aspect of the invention, a method implemented in a computer infrastructure having computer executable code tangibly embodied on a computer readable storage medium having programming instructions is operable to: receive unique identifier information and activity information for a user that referred a social media link to one or more other users; generate a reference identifier for a referrer of the social media link to the one or more other users; and embed the generated reference identifier into the social media link. The generated reference identifier includes a concatenation of the unique identifier information, the activity information, and information pertaining to referrals of the social media link prior to the refer to the one or more other users.

In another aspect of the invention, a computer program product is provided on a computing device. The computer program product includes a computer readable storage medium having program instructions embodied therewith. The computer readable storage medium is not a transitory signal per se, and the program instructions are readable by a computing device to cause the computing device to perform a method that includes: receiving unique identifier information and activity information for a member of one or more social networks that referred a social media link to one or more other members of the one or more social networks; generating a reference identifier for a referrer of the social media link to the one or more other members; and embedding the generated reference identifier into the social media link. The generated reference identifier includes a concatenation of a portion of the unique identifier information, portions of the activity information, and portions of information pertaining to referrals of the social media link prior to the refer to the one or more other members.

In yet another aspect of the invention, a system is provided for that includes a CPU, a computer readable memory and a computer readable storage medium. The system further includes program instructions. The program instructions are stored on the computer readable storage medium for execution by the CPU via the computer readable memory. The program instructions: receive unique identifier information and activity information for a first member of one or more social networks that referred a social media link to one or more other members of the one or more social networks; generate a first reference identifier for a referrer of the social media link to the one or more other members; embed the generated first reference identifier into the social media link, wherein the generated first reference identifier includes a concatenation of the unique identifier information and the activity information for the first member; receive unique identifier information and activity information for a second member of the one or more other members that referred the social media link to one or more additional members of the one or more social networks; generate a second reference identifier for the refer of the social media link to the one or more additional members; and embed the generated second reference identifier into the social media link, wherein the generated second reference identifier includes a concatenation of the unique identifier information and the activity information for the first member and the second member.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIGS. 6-8 show visual representations of examples of operation in accordance with aspects of the invention.

DETAILED DESCRIPTION

Figure 1:
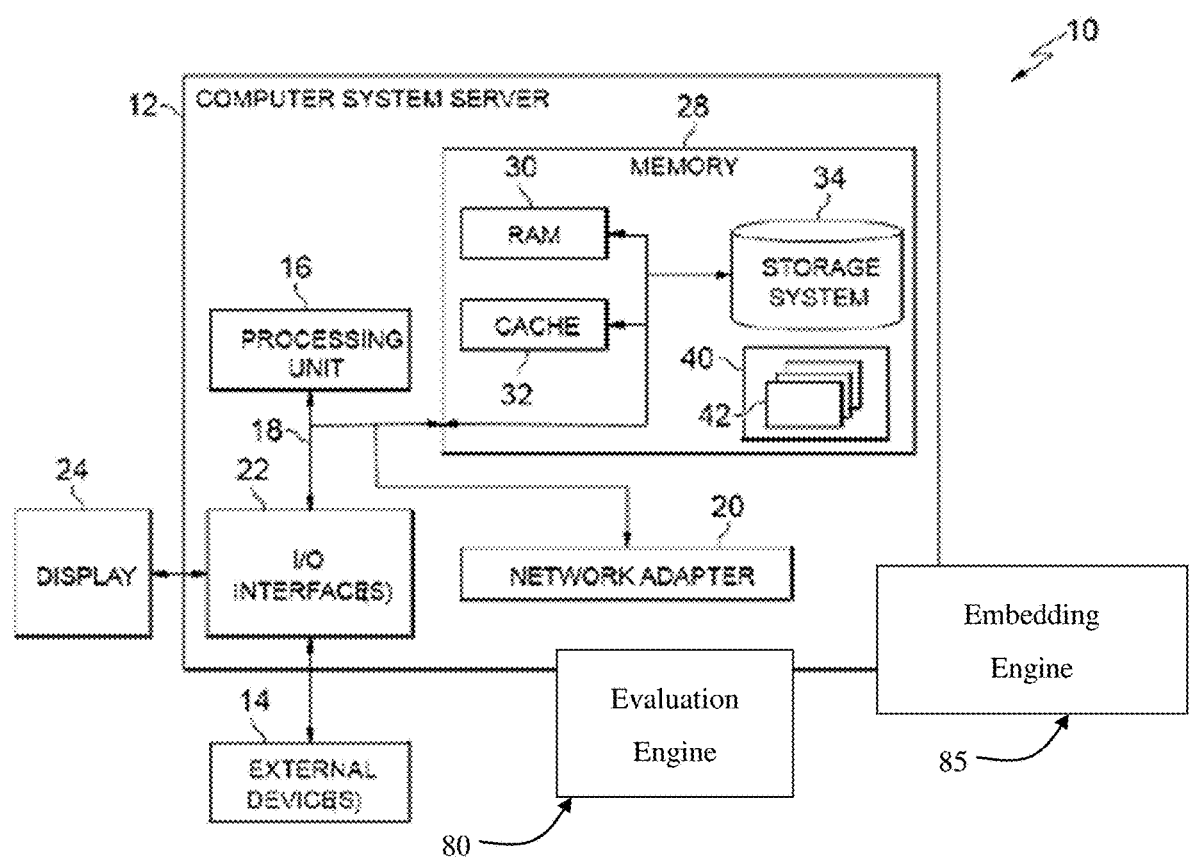
FIG. 1 depicts a cloud computing node according to an embodiment of the present invention.

The technical character of the present invention generally relates to electronic commerce, and more particularly, to systems and methods for tracking and measuring the influence of social networking members on groups of friends to engage in electronic commerce. More specifically, the present invention provides systems and methods that implement technical features such as evaluation and embedding hardware and/or software that interoperate to transform a social media endorsement link (or re-endorsement link) when a user activates the endorsement link or re-endorsement link.

In embodiments, the systems and methods are configured to detect an originating user who "endorsed" an original electronic commercial item (e.g., a promotional offer such as an electronic coupon) and embed that person's identification (ID) as a source ID into a social media endorsement link (or re-endorsement link) of the endorsed content based off the original electronic commercial item. The systems and methods are also configured to detect a current or subsequent user of the endorsed content and embed that person's ID as a source ID (source prime) into the social media endorsement link (or re-endorsement link) of the newly endorsed content based off the endorsed content. Consequently, the social media endorsement link (or re-endorsement link) is dynamically transformed to maintain a record of who originally found the content and who endorsed the content with others.

In embodiments, the systems and methods may also be configured to pass the social media endorsement link (or re-endorsement link) comprising the IDs (e.g., the person's ID and source ID) to a destination page(s) where the social media endorsement(s) is displayed (e.g., Facebook® timeline, Twitter® feed, Google Plus RSS Feed, etc.). The systems and methods may be further configured to capture information displayed on a source page (e.g., the destination page(s) where the social media endorsement(s) is displayed) that includes the ID of other users that "liked" or commented on the social media endorsement(s). Ultimately, the systems and methods are configured to pass on the endorsement ID information and the liked ID information to an online retail website where a purchase of the product or service which was "endorsed" or "liked" was performed in order to track and determine the influence that each person associated with the IDs had on the eventual purchase of the product or service.

The advantage of the aforementioned technical solution of using dynamically transformed social media endorsement links (or re-endorsement links) to track and objectively measure influence of members on the purchase of products or services is that it will eliminate the technical problem of only being aware of the originating source of the promotional item, and thus an unclear idea on the influence of advertising targets. For example, implementations of the present invention provide a technical contribution over conventional marketing campaign systems and methods because the technical features of the present invention interoperate to transform a social media endorsement link (or re-endorsement link) when a user clicks on the endorsement link or re-endorsement link such that advertisers can identify and target "high-influence" persons with advertising, and create business models which might arise from such targeting. For instance, if a person's influence can be objectively measured, then new models can be developed for pricing and delivering advertisements based on these metrics. The present invention is particularly of relevance to social media, and more broadly, to "social business," by which broad swaths of the population can be better known to analytics tools, thus allowing for the most positive possible interactions between these persons and the advertisers wishing to get their attention.

One form of interaction on or participation in a social network website is "messaging," but there are other forms of interaction or participation that involve: "posting status updates" and/or "tweeting" and/or "Reply" tweeting with or without accompanying electronic files; "posting comments" on uploaded electronic files such as digital photographs and videos, where the comments are displayed in a stack in temporal order; and endorsing a comment, an uploaded file (e.g., digital photograph), an html hyperlink, an identity on a social network, a product or service, etc. Each social network provides its own way to perform endorsements (e.g., create and propagate promotional information to users of the social network), that is, endorse a comment, file, html hyperlink, identity, or something else, on that social network. On Facebook®, you "Like" or "Share" an identity. On Twitter® you "Follow" an identity and "Retweet" a post, which has the effect of endorsing the post. On Google+ you can "+1" an identity. For example, to comment on or endorse someone else's endorsement via the "Like" or "Share" button (and other endorsement mechanisms, such as Follow and Retweet, and +1) meets an unmet need of advertisers; namely, it provides advertisers with feedback from consumers regarding which advertisements are effective.

These examples of endorsement systems and methods are not intended to limit the present invention; however, they all have in common the use of a hyperlink associated with the "Like", "Share", "Retweet", "Follow", or "+1" that identifies and provides information pertaining to the comment, file, html hyperlink, identity, or something else that has been endorsed. In embodiments, of the present invention it is this hyperlink associated with the "Like", "Share", "Retweet", "Follow", or "+1" that is used as a receptacle to store historical information identifying all persons who clicked the hyperlink to provide advertisers with additional feedback from consumers including which members of the social network have the greatest influence on their friends or contacts. For example, embodiments of the present invention transform the social media endorsement link (or re-endorsement link) when a user clicks on the endorsement link (or re-endorsement link) to include historical information identifying the user who clicked the endorsement link (or re-endorsement link). The historical information allows for advertisers to identify who endorsed or re-endorsed the comment, file, html hyperlink, identity, or something else such that they may be able to target "high-influence" persons with advertising, and create business models which might arise from such targeting.

For instance, after receiving a promotional offer, viewing an advertisement, or purchasing a product or service on a third-party website (e.g., an online retail store), a user of a social network may be presented with an opportunity (e.g., a button, a link, etc.) to share information regarding the promotion, the advertisement, or the purchase with the user's friends on the social network. If the user takes the opportunity to share information regarding the promotion, the advertisement, or the purchase, the button or link is clicked by the user of the social network and the click triggers displaying the promotion, advertisement, or information regarding the purchase to the user's friends on the social network. For example, a friend of the user on the social network may be presented with the promotion, advertisement, or information regarding the purchase when the friend views a page (e.g., the friend's landing page or bulletin board) on the social network. Additionally, through code and/or a widget (e.g., an application) embedded in the third-party website, information regarding the click (e.g., information identifying the user and the action performed) by the user is embedded in the endorsement link (or re-endorsement link) associated with the promotion, advertisement, or information regarding the purchase such that historical information pertaining to who shared or liked the promotion, advertisement, or information regarding the purchase can be collected and transmitted to a server of the host of the third-party website for further analysis.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. FIG. 1 can also represent a computing infrastructure capable of performing and/or implementing tasks and/or functions of the methods described herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16. In embodiments, the computer system/server 12 comprises or communicates with evaluation engine 80 and/or embedding engine 85, as described in greater detail herein.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. For example, some or all of the functions of the evaluation engine 80 and/or embedding engine 85 may be implemented as one or more of the program modules 42. Additionally, the evaluation engine 80 and/or embedding engine 85 may be implemented as separate dedicated processors or a single or several processors to provide the functionality described herein. In embodiments, the evaluation engine 80 and/or embedding engine 85 performs one or more of the processes described herein, including but not limited to: concatenating information into a reference identifier, embedding the reference identifier into a link; evaluating the reference identifier to determine the information concatenated into the reference identifier, and reverse mapping the determined information to generate a referring hierarchy and/or chain of influence.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID (redundant array of inexpensive disks or redundant array of independent disks) systems, tape drives, and data archival storage systems, etc.

Figure 2:
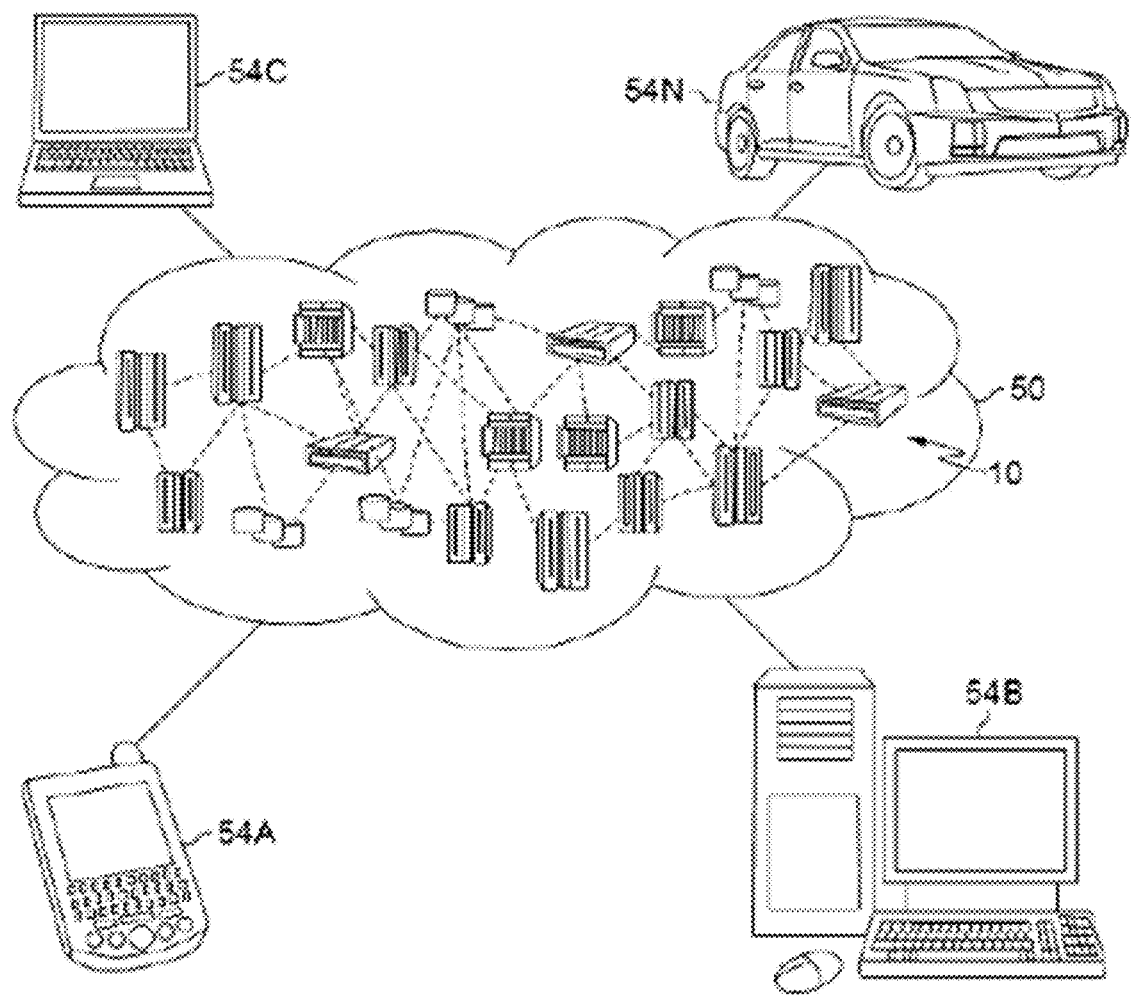
FIG. 2 depicts a cloud computing environment according to embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
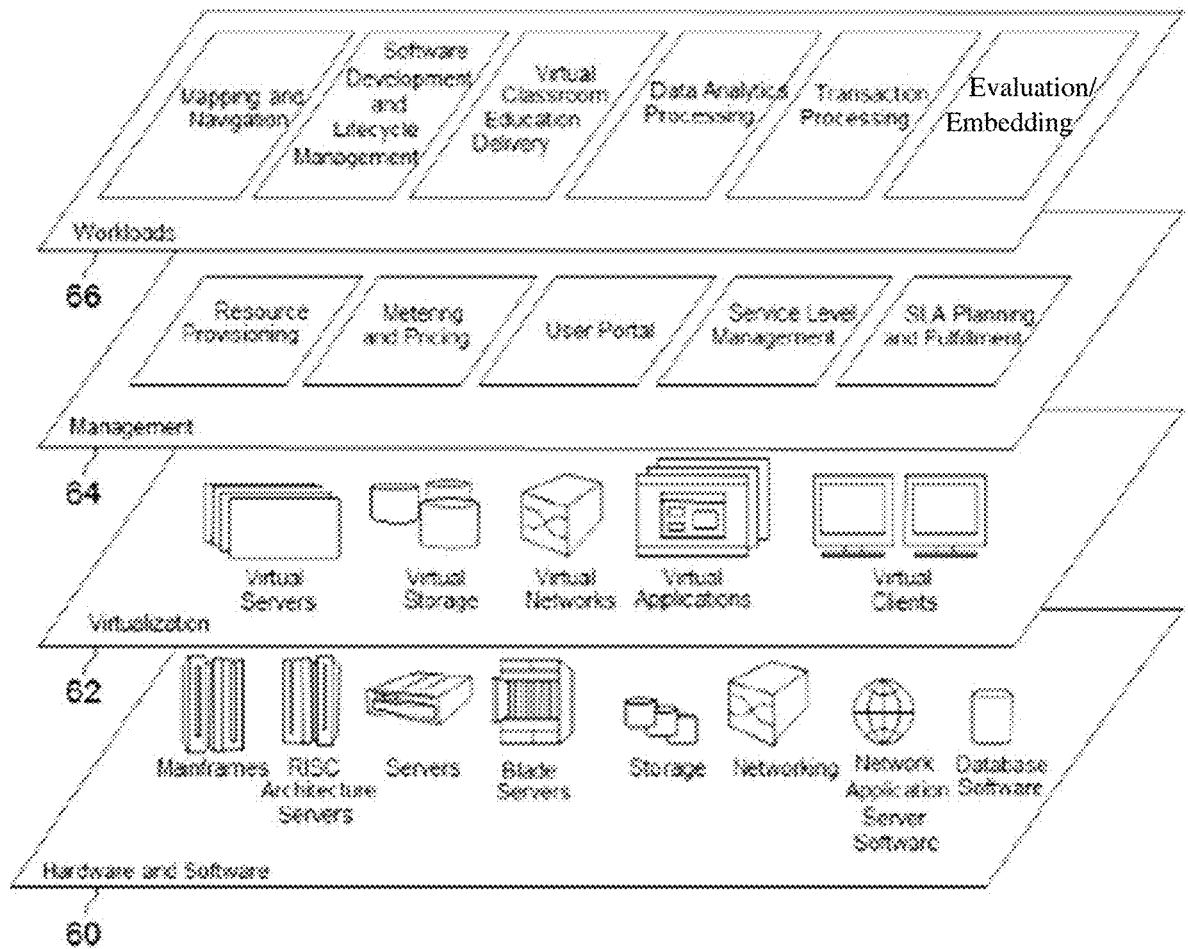
FIG. 3 depicts abstraction model layers according to embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and evaluation and/or embedding functions as described herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
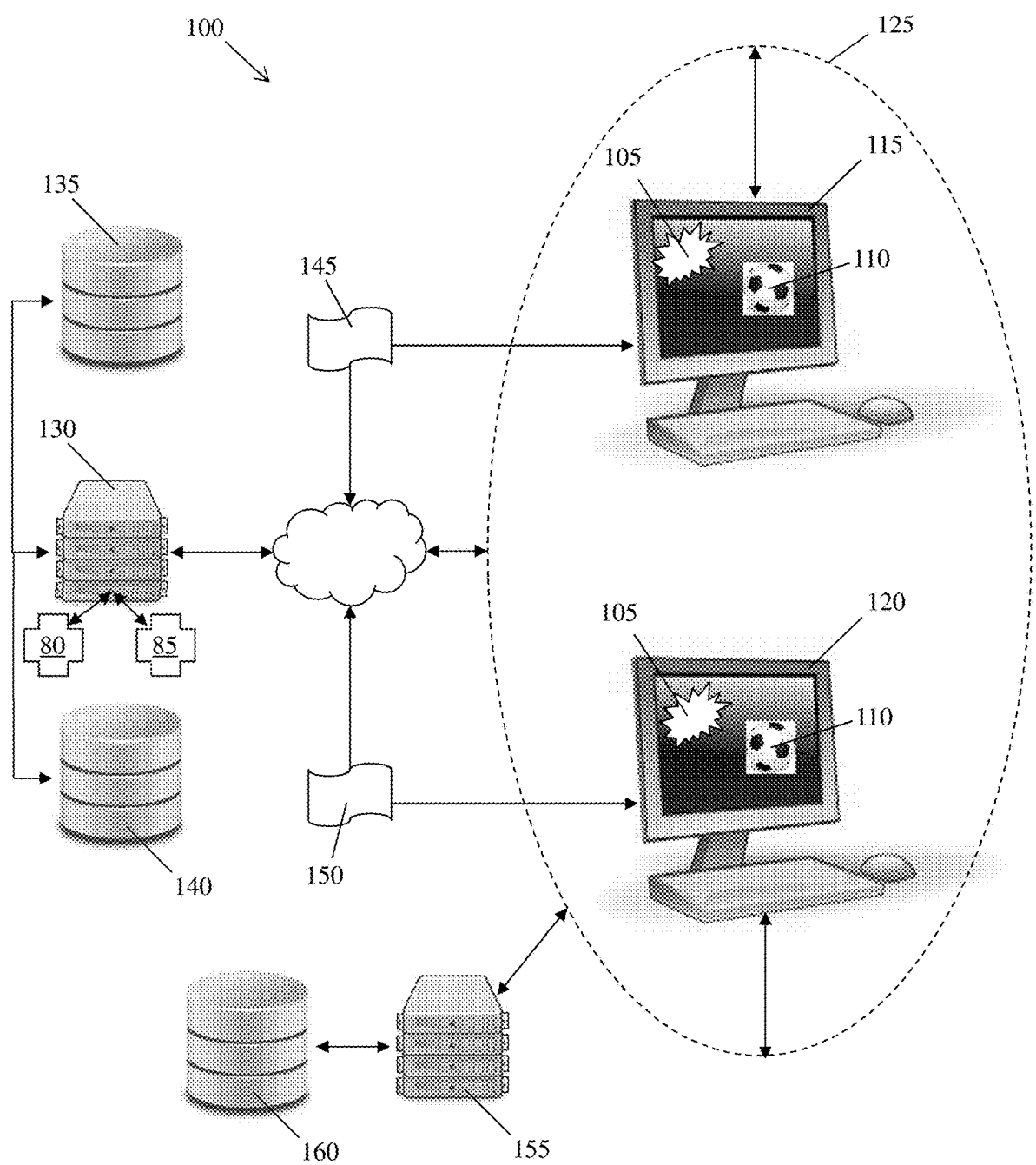
FIG. 4 shows a high level architecture for implementing processes in accordance with aspects of the invention.

FIG. 4 is a high level architecture for implementing processes in accordance with aspects of the present invention. In embodiments, a computing system 100 is provided for displaying promotions and advertisements 105 regarding a product or service and/or displaying the product or service 110 to one or more users, e.g., one or more users of a third-party website, on one or more local computing devices 115 and 120. The third-party website can be any of a wide variety of websites seeking to promote information associated with the website. For example, the third-party website can be an online retailer, a news website, a website distributing media, etc. The one or more users may be members of one or more social networks 125, and the local computing devices 115 and 120 may be similar to the local computing devices 54A-N depicted in FIG. 2.

The computing system 100 also depicts use of a computing device 130, e.g., computing node 10, and a plurality of data storage devices 135 and 140, which may comprise, for example, storage nodes in the cloud as depicted in FIG. 2, to dynamically transform social media endorsement links 145 and 150 (e.g., a universal resource locator (URL)) based on the activity of the one or more users. The computing device 130 may include or communicate with the evaluation engine 80 and embedding engine 85 described herein with respect to FIG. 1. Although only two local computing devices 115 and 120, two data storage devices 135 and 140, and two social media endorsement links 145 and 150, are shown, it is to be understood that any number of computing devices, storage devices, and social media endorsement links, may be used within the scope of the invention.

The computing system 100 also depicts use of a computing device 155, e.g., a server of the one or more social networks 125, for creating promotional or endorsement information based upon one or more user's activity on the third-party website. The computing system 100 also depicts propagation of the created promotional or endorsement information from the computing device 155 to other users of the one or more social networks 125.

In embodiments, one or more of the social media endorsement links 145 and 150 pertaining to the promotions or advertisements 105 or the product or service 110 is clicked by a user A of one or more social networks 125. The click performed by the user A is an example of user activity on, for example, the third-party website that can trigger the creation of promotional or endorsement information via the computing device 155. Through code and/or a widget (e.g., an application) embedded in the third-party website, information regarding the click (e.g., information identifying the user and the action performed) by user A is transmitted to the computing device 130 and the computing device 155.

In embodiments, the computing device 130 using the evaluation engine 80 and embedding engine 85 can transform the one or more of the social media endorsement links 145 and 150 upon receiving the information regarding user A's activity (click) on the third-party website. For example, the computing device 130 can receive a URL request from user A clicking on the one or more social media endorsement links 145 and 150, read and evaluate a current referrer code embedded within the one or more social media endorsement links 145 and 150, associate user A who is accessing the one or more social media endorsement links 145 and 150 and who is currently logged into the one or more social networks 125 with the one or more social media endorsement links 145 and 150 using the information identifying user A, and reissue a new referrer code embedded within the one or more social media endorsement links 145 and 150 that incorporates the entire hierarchy of referrals inside the one or more social media endorsement links 145 and 150 based on the information identifying each user. Consequently, the one or more social media endorsement links 145 and 150 are transformed into a record keeper of all users that have provided a referral for the promotions and advertisements 105 or the product or service 110.

In embodiments, the evaluation engine 80 and embedding engine 85 may be implemented within the computing device 130 or as a standalone application or module within the computing device 130, and made available (e.g., made available as a service) to the one or more social networks 125 including the computing device 155 by way of an application programming interface (API) framework. The API framework defines a set of functionalities of the evaluation engine 80 and embedding engine 85 that are independent of their respective implementation, allowing both definition and implementation to vary without compromising each other. The API framework is used to allow for the integration of new functionality (e.g., embedding referral information into one or more social media endorsement links) into the one or more social networks 125 including the computing device 155, or to share data between the computing device 130 and the one or more social networks 125 including the computing device 155.

The computing device 155 can create the promotional or endorsement information upon receiving the information regarding the activity of user A on the third-party website. The promotional or endorsement information (e.g., advertisements, news, etc.) can relate to a variety of content (e.g., products, news, events, online media content (videos, blogs, etc.), services, etc.) and can be created in a variety of media formats (e.g., text, image, video, interactive application, game, etc.). For example, the promotional or endorsement information may include the image from the third-party website and promotional or endorsement text indicative that user A likes or recommends the promotions or advertisements 105 or the product or service 110. Additionally, in accordance with aspects of the present invention, the one or more of the social media endorsement links 145 and 150 pertaining to the promotions or advertisements 105 or the product or service 110 that were selected (clicked) to generate the promotional or endorsement information remain associated with the created promotional or endorsement information. The new referrer code being embedded within the one or more social media endorsement links 145 and 150.

The computing device 155 can store the promotional or endorsement information and the one or more social media endorsement links 145 and 150 in a data storage device 160, e.g., a database. The data storage device 160 (e.g., storage system 34 of FIG. 1) can persistently store the promotional or endorsement information and, upon receiving a request for the promotional or endorsement information from the one or more social networks 125, display the promotional or endorsement information to one or more other users of the one or more social networks 125. The promotional or endorsement information can be persistently stored for a duration of time determined by the third-party website, the computing device 155, and/or the user of the one or more social networks 125.

By persistently storing the promotional or endorsement information in the data storage device 160, an action from an activity stream associated with user A that is relevant to the third-party website can be captured for prominent display to one or more other users of the one or more social networks 125. For example, entries in user A's activity stream can be presented in the user A's social network page (e.g., a user's profile page) in chronological order. User A's activity stream can be a list of activities associated with user A and/or one or more other users of the one or more social networks 125 having an acquaintance relationship with user A. For instance, user A's activity stream can be a chronological list of postings regarding what user A is doing (e.g., 11:30 AM—lunch break at restaurant "v", which is recommended by the user, 12:30 PM—back at work, 3:00 PM—purchase of product "w" online from a website of a particular retail store, 5:00 PM leaving work for home, 6:00 PM making dinner with another user of the one or more social networks 125 using products "x", "y", and "z", etc.).

In embodiments, one or more of the social media endorsement links 145 and 150 associated with the promotional or endorsement information (e.g., displayed on user A's activity stream) may be clicked or activated by user B of one or more social networks 125. The click or activation performed by the user B is an example of user activity on, for example, user A's social network page such as a "Like" or "Share" action. Through code and/or a widget (e.g., an application) embedded in user A's social network page, information regarding the click (e.g., information identifying the another user and the action performed) by user B is transmitted to the computing device 130 and the computing device 155.

In embodiments, the computing device 130 using the evaluation engine 80 and embedding engine 85 can transform the one or more of the social media endorsement links 145 and 150 upon receiving the information regarding user B's activity (click) on user A's social network page. For example, the computing device 130 can (i) receive a URL request from user B clicking on the one or more social media endorsement links 145 and 150, (ii) read and evaluate a current referrer code embedded within the one or more social media endorsement links 145 and 150, (iii) associate user B who is accessing the one or more social media endorsement links 145 and 150 and who is currently logged into the one or more social networks 125 with the one or more social media endorsement links 145 and 150 using the information identifying user B, and (iv) reissue a new referrer code embedded within the one or more social media endorsement links 145 and 150 that incorporates the entire hierarchy of referrals inside the one or more social media endorsement links 145 and 150 based on the information identifying each user. Consequently, the one or more social media endorsement links 145 and 150 transforms into a record keeper of all users that have provided a referral for the promotions and advertisements 105 or the product or service 110.

In addition to creating promotional or endorsement information based upon actions performed by a user of a social network on a third-party website, the computing device 155 can additionally or alternatively propagate the created and persistently stored promotional or endorsement information with the associated social media endorsement links 145 and 150 to other users of the one or more social networks 125, e.g., other users such as user C that has acquaintance relationships with user A and/or B. The computing device 155 can send a request for promotional or endorsement information to display to user C. The computing device 155 can be triggered to send a request in a variety of ways, such as by user C requesting a page of the one or more social networks 125 (e.g., the user's profile page, another user's profile page, a community page, etc.) or in anticipation of user C requesting a page of the one or more social networks 125 (e.g., pre-caching promotional or endorsement information when users are currently active on the social network).

In response to receiving the request, the computing device 155 can determine which of the promotional or endorsement information stored in the data storage device 160 should be displayed to user C. This determination can be based upon a variety of factors, for example, whether user C has an acquaintance relationship (e.g., friendship, colleague, relative, etc.) with user A or B who also have promotional or endorsement information created and stored in the data storage device 160. Propagation of promotional or endorsement information via acquaintance relationships can create "word of mouth advertising" on the one or more social networks 125.

In other embodiments where the computing device 155 received a request from one or more computing devices 115 and 120 associated with user C, the computing device 155 can return the promotional or endorsement information with the social media endorsement links 145 and 150 to the one or more computing devices 115 and 120. In such implementations, the code and/or a widget (e.g., an application) embedded in a web page that requested the promotional or endorsement information can display the promotional or endorsement information in a prominent location on the page (e.g., in the center of the displayed page). Additionally, through the code and/or a widget (e.g., an application), information regarding the request (e.g., information identifying the other user and the action performed) for promotional or endorsement information by user C is transmitted to the computing device 130 and the computing device 155.

In embodiments, the computing device 130 using the evaluation engine 80 and embedding engine 85 can transform the one or more of the social media endorsement links 145 and 150 upon receiving the information regarding user C's request for promotional or endorsement information. For example, the computing device 130 can (i) receive a URL request from user C clicking on the one or more social media endorsement links 145 and 150, (ii) read and evaluate a current referrer code embedded within the one or more social media endorsement links 145 and 150, (iii) associate user C who is accessing the one or more social media endorsement links 145 and 150 and who is currently logged into the one or more social networks 125 with the one or more social media endorsement links 145 and 150 using the information identifying user C, and (iv) reissue a new referrer code embedded within the one or more social media endorsement links 145 and 150 that incorporates the entire hierarchy of referrals inside the one or more social media endorsement links 145 and 150 based on the information identifying each user. Consequently, the one or more social media endorsement links 145 and 150 transforms into a record keeper of all users that have provided a referral for the promotions and advertisements 105 or the product or service 110.

In embodiments, user C may proceed to purchase the product or service 110 from a retailer such as the third party website, and computing device 130 can forward the one or more social media endorsement links 145 and 150 to the third party website upon user C initiating the transaction for the purchase of the product or service 110 from the third party website. The one or more social media endorsement links 145 and 150 having the referrer code embedded within may be used by the retailer of the third party website to evaluate penetration of the generated promotional or endorsement information pertaining to the promotions or advertisements 105 or the product or service 110 into the one or more social networks 125. In other embodiments, computing device 130 can forward the one or more social media endorsement links 145 and 150 to the third party website or any customer of a service (e.g., a customer of the service provided by the present invention) on a periodic basis, e.g., monthly, such that the retailer of the third party website or any customer of the service can monitor and evaluate penetration of the generated promotional or endorsement information pertaining to the promotions or advertisements 105 or the product or service 110 into the one or more social networks 125.

Advantageously, the systems and methods described herein allow the retailer of the third party website or any customer of the service to understand who their biggest influencers are based on the hierarchy incorporated within the one or more social media endorsement links 145 and 150. The retailer of the third party website or any customer of the service can understand who referred a product to whom, and so on down the line until a transaction or purchase was consummated. Reverse path information could be invaluable to retailers who want to influence a similar set of customers for a future product. The retailer could opt to contact those influencers directly (e.g., direct target advertising) or give them sample products in order to facilitate further recommendations through social media.

Figure 5:
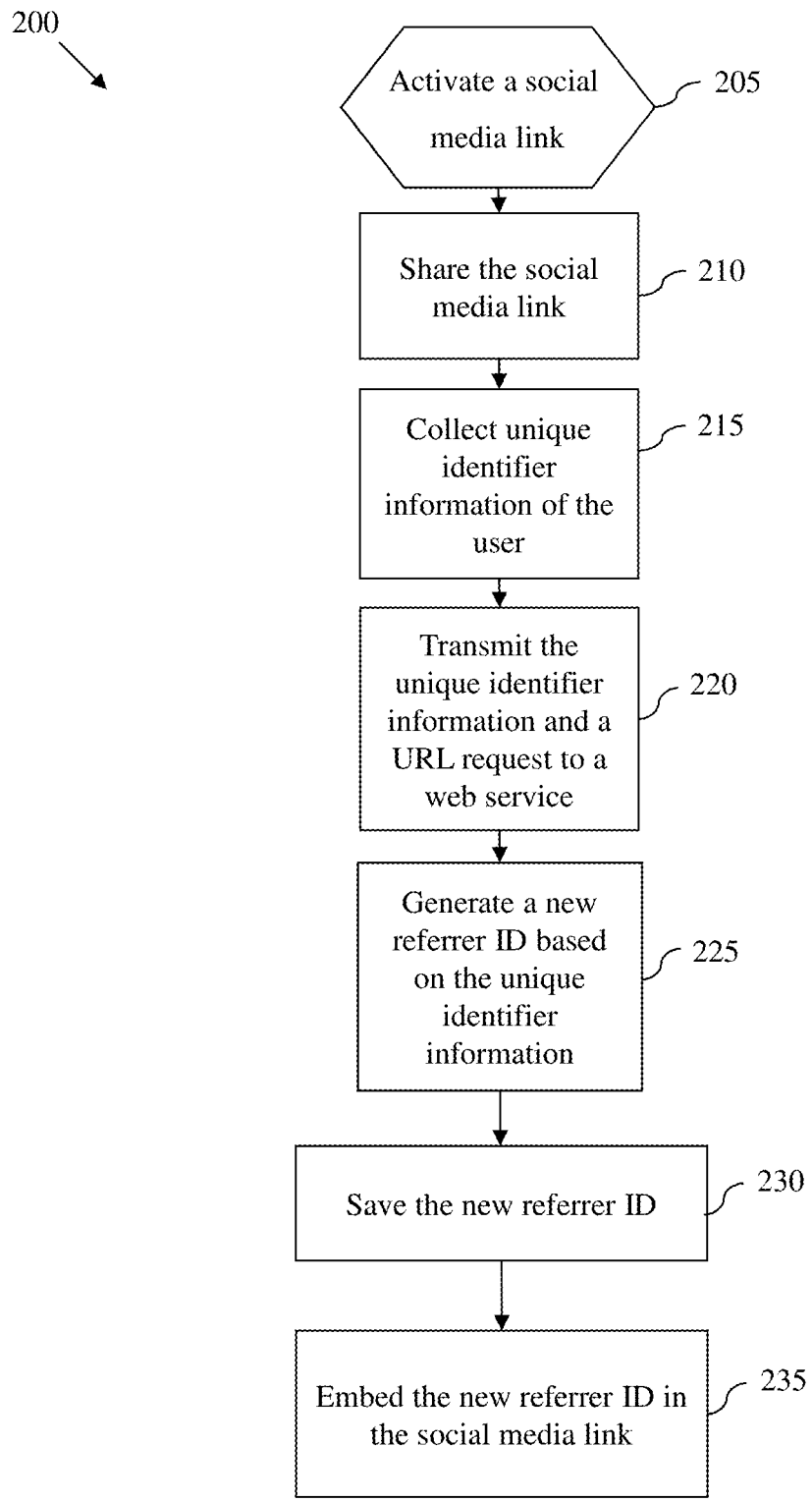
FIG. 5 shows an exemplary flow in accordance with aspects of the invention.
Figure 9:
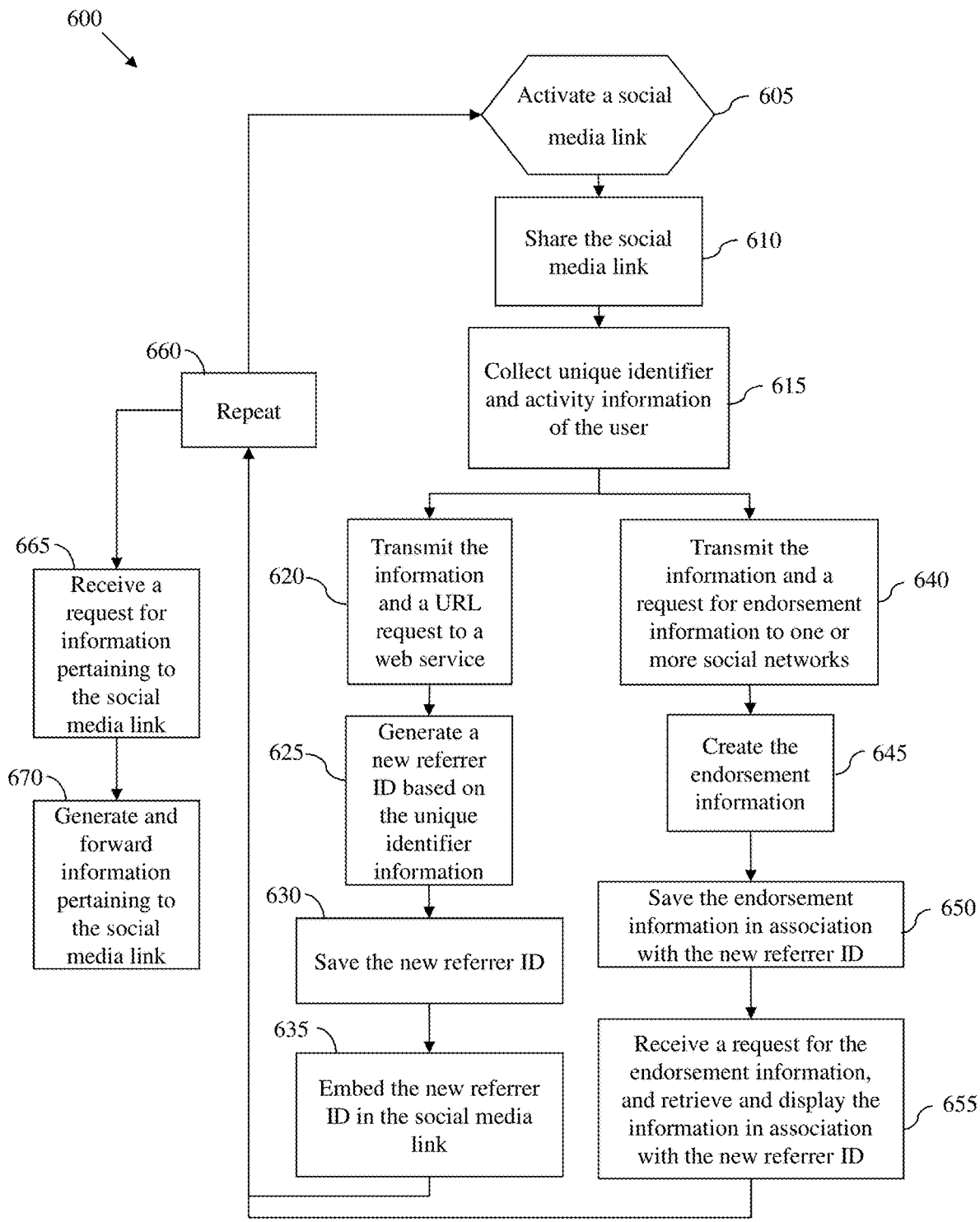
FIG. 9 shows an exemplary flow in accordance with aspects of the invention.

FIGS. 5 and 9 show exemplary flows for performing aspects of the present invention. The steps of FIGS. 5 and 9 may be implemented in the environment of FIG. 1, for example. As noted above, the flowchart(s) illustrate the architecture, functionality, and operation of possible implementations of systems, methods, and computer program products as already described herein in accordance with the various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 5 is a flow diagram illustrating a process 200 for modifying a social media link in accordance with aspects of the present invention. At step 205, a user A activates a social media link. In embodiments, the social media link may pertain to a promotion or advertisement or a product or service that an action is taken on by user A, who is a member of a one or more social networks. The action performed by user A is an example of user activity on, for example, a third-party website or a social network page of one or more other users of the one or more social networks. In embodiments, the action may be user A clicking on the social media link, opening an email, accessing a quick response code (a QR code), scanning a bar code, copying a URL, making a purchase of a product or service, etc.

At step 210, user A may choose to indirectly share (e.g., endorse or refer) the social media link with one or more other users of the one or more social networks via a separate action such as forwarding an email or clicking on a social networking widget, e.g., "Share" or "Like" graphical user interface (GUI) button, or the action performed by user A on the social media link can directly trigger sharing or endorsement of the social media link with the one or more other users of the one or more social networks.

At step 215, when the social media link is shared with the one or more other users, program code is executed to look-up user A's authentication credential and collect unique identifier information for user A (e.g., an email address of the user). For example, through code and/or a widget (e.g., an application) embedded in the third-party website or the social network page, information regarding user A's activity (e.g., information identifying the user and the action performed) is collected.

At step 220, the information regarding user A's activity is transmitted to a web service with a request for a new referrer ID. For example, through the code and/or a widget (e.g., an application) embedded in the third-party website or the social network page, information regarding user A's activity (e.g., information identifying the user and the action performed) is transmitted to a computing device (e.g., computing device 130 described with respect to FIG. 4) with a request, e.g., a URL request, for a new referrer ID.

At step 225, the web service generates the new referrer ID based on the unique identifier information for user A, the action taken by user A, and unique identifier information for all previous users that have endorsed the social media link either by indirect or direct endorsement. For example, the URL request may include a referrer ID that can be expanded from a look-up table or hash table, as explained in further detail herein, to reveal a referral path for the social media link. The computing device (e.g., computing device 130 as described with respect to FIG. 4) can be configured to generate the new referrer ID.

At step 230, the generated new referrer ID is stored in a data storage device. For example, the generated new referrer ID is stored in the look-up table or hash table of the web service and/or the one or more social networks (e.g., data storage devices 135, 140, or 160 as described with respect to FIG. 4). At step 235, the generated new referrer ID is embedded in the social media link. For example, the generated new referrer ID is embedded in the URL of the social media link and forwarded to the one or more social networks (e.g., computing device 155 of one or more social networks 125 as described with respect to FIG. 4). The steps of process 200 are repeated each time a user re-shares the social media link with one or more other users of the one or more social networks.

Figure 6:
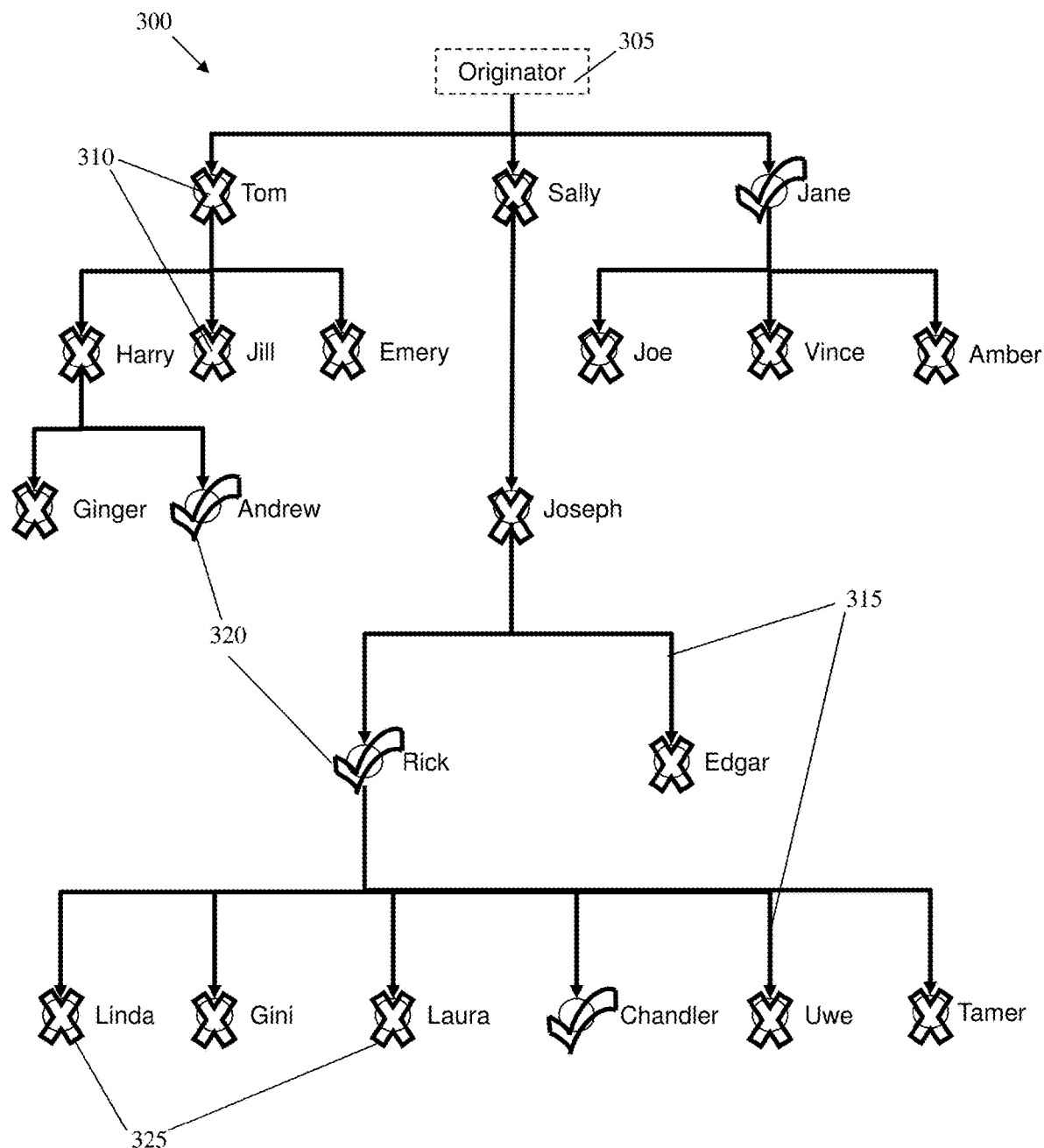

FIG. 6 shows an example hierarchy tree 300 depicting the path of referrals originating from a social media link initially activated or received by an originator 305 who is a member of one or more social networks. The hierarchy tree 300 could reside in the computing device 130 and/or data storage devices 135 and 140, e.g., as a part of a cloud service, (as described with respect to FIGS. 1-4) and/or in the computing device 155 and/or data storage 160 of the one or more social networks 125 (as described with respect to FIG. 4). The hierarchy tree 300 depicts acquaintance relationships among some of the users of the one or more social networks. In the hierarchy tree 300, each node 310 represents a user (Users Tom-Tamer) and each vertex 315 connecting two nodes represents a referral or endorsement (e.g., a "Share" or "Like") between two of the users that have an acquaintance relationship. For example, Tom has referred or endorsed a social media link with Harry, Jill, and Emery. In the hierarchy tree 300, each check mark 320 and "X" mark 325 represent activity (e.g., purchase of the product or service) or the lack of activity, respectively, on the part of each user.

As shown in FIG. 6, originator 305 shared a social media link (e.g., shared via clicking, email, a GUI button, etc.) to Tom, Sally, and Jane, of which Jane took some form of action. Tom shared the social media link with Harry, Jill, and Emery. Harry shared the social media link with Ginger and Andrew, of which Andrew took some form of action. Sally shared the social media link with Joseph. Joseph shared the social media link with Rick and Edgar, of which Edgar took some form of action. Rick shared the social media link with Linda, Gini, Laura, Chandler, Uwe, and Tamer, of which Chandler took some form of action. Jane shared the social media link with Joe, Vince, and Amber.

As should be understood, the hierarchy tree 300 depicts the actions originating from originator 305 such that a user of such a service can quickly ascertain (i) the originator 305, Harry, Joseph, and Rick had the greatest success in achieving activity on the social media link (e.g., all shared the social media link and obtain an action directly attributable to their share), and (ii) users Jane, Andrew, Rick, and Chandler all took action, which may equate to those users liking or having a need for the product or service. Additionally, the hierarchy tree 300 depicts the path of referrals originating from originator 305 such that a user of such a service can quickly ascertain that Rick had the greatest influence in sharing the social media link (e.g., Rick shared the social media link with the greatest number of users (6)).

In embodiments, each social media link or URL would contain an embedded referrer ID that may be used in conjunction with a data table to identify a current referrer plus a chain of previous referrers all the way back to the originator. Consequently, the embedded referrer ID and data table can be used to construct the hierarchy tree 300 within the computing device 130 and/or data storage devices 135 and 140, e.g., as a part of a cloud service, (as described with respect to FIGS. 1-4) and/or in the computing device 155 and/or data storage 160 of the one or more social networks 125 (as described with respect to FIG. 4). For example, the social media link or URL may include: http://www.mystore.com/index.htm?RefID=H84KQ4dBC45AXBC02. In this case a web service (e.g., the computing device 130 as described with respect to FIG. 4) could read the RefID and expand the RefID using a data table, which provides the referral path. Using the data table and assuming RefID H84KQ4d refers to the originator, at any given time, the systems or methods of the present invention reading or evaluating the URL are configured to reconstruct the hierarchy of each referral back to the origination.

For example, as shown in FIG. 7, upon receiving a URL request with originating RefID H84KQ4d, the web service (e.g., the computing device 130 as described with respect to FIG. 4) is configured to utilize data table 400 to generate a new RefID 405, i.e., H84KQ4dBC45AXBC02 that is indicative of the action taken or received by the originator. Specifically, the new RefID 405 is a concatenation of all information received when the original social media link was provided to the originator. The information includes the website URL 410: www.mystore.com/index.htm/Prod/Mobile device/Campaign2 (e.g., the originating social media link) that identifies the third party website as a website of the retailer my store, the product as a mobile device, and the fact that the social media link was provided as a part of market campaign 2.

The information further includes: (i) the originating event as being identified as the RefID 415: H84KQ4d; (ii) the transaction of providing the social media link as a part of the marketing campaign 2 as being identified as transaction ID user 420: SHARE1001ABC; (iii) the product offer ID 425 as being identified as mobiledevice12345; (iv) the retailer ID 430 as being identified as MyStore23LAX; (v) the transaction ID system 435 as being identified as 2001ABC; and (v) the session ID 440 as being identified as Est302. Consequently, the web service could generate a new data element or RefID 405: H84KQ4dBC45AXBC02 as a concatenation of all of the information received (e.g., the (H84KQ4d) identifies RefID 415, the (BC) identifies transaction ID 420, the (45) identifies the product offer ID 425, the (AX) identifies the retailer ID 430, the (BC) identifies the transaction ID system 435, and the (02) identifies the session ID 440), and embed the new RefID 405: H84KQ4dBC45AXBC02 into the original URL to create new URL: http://www.mystore.com/index.htm?RefID=H84KQ4dBC45AXBC02.

Moreover, as shown in FIG. 7 and with reference to hierarchy tree 300 depicted in FIG. 6, upon the originator sharing the new URL: http://www.mystore.com/index.htm?RefID=H84KQ4dBC45AXBC02 with Tom, Sally, and Jane, concurrently or subsequently new URLs: http://www.mystore.com/index.htm?RefID=FB84KQ4dIL45AXBC103, http://www.mystore.com/index.htm?RefID=G84KQ4dOM45AXBC204, and http://www.mystore.com/index.htm?RefID=G84KQ4dAN45AXBC305 are similarly generated for each respective share. For example, FB84KQ4dIL45AXBC103 is a concatenation of information that identifies the share as an original share (ORGSHARE) of the social medial link (84KQ4d) to a Facebook® page (FB) of Sally (IL) and did not result in any action being taken (NA) by Sally. Furthermore, the (45) identifies the product offer ID 425, the (AX) identifies the retailer ID 430, the (BC1) identifies the transaction ID system 435, and the (03) identifies the session ID 440. G84KQ4dOM45AXBC204 is a concatenation of information that identifies the share as an originating share (ORGSHARE) of the social medial link (84KQ4d) to a Google® page (G) of Tom (OM) and did not result in any action being taken (NA) by Tom. Furthermore, the (45) identifies the product offer ID 425, the (AX) identifies the retailer ID 430, the (BC2) identifies the transaction ID system 435, and the (04) identifies the session ID 440. G84KQ4dAN45AXBC305 is a concatenation of information that identifies the share as an originating share (ORGSHARE) of the social medial link (84KQ4d) to a Twitter® page (T) of Jane (AN) and did result in action being taken ($$$) by Jane. Furthermore, the (45) identifies the product offer ID 425, the (AX) identifies the retailer ID 430, the (BC3) identifies the transaction ID system 440, and the (05) identifies the session ID 450.

FIG. 8 shows a chain of influence 500 of one user (Sally) and how RefIDs can be mapped using the data table 400 depicted in FIG. 7 to reverse engineer a path of referrals of the hierarchy tree 300 depicted in FIG. 6 back to the originator. For example, RefID 505: FB84KQ4dIL45AXC103 maps to segmentation 510: C103, Session ID 515: EST303, and transaction user ID 520: ORGSHARE!NA1001SIL. RefID 505: FB84KQ4dIL45AXC103 also reverse maps from transaction user ID 520/525: SALSHARE!NA1001JPH (it should be understood that not all RefIDs 505 will reverse map since there is not always a share or action taken by each user), which provides information that Sally shared the social media link with Joseph. Accordingly, the mapping and reverse mapping of each RefID 505 within the chain of influence 500 can be used to generate a path of referrals of the hierarchy tree 300 depicted in FIG. 6 for each user.

Advantageously, the hierarchy tree 300, the data table 400, and the chain of influence 500 described herein allow the retailer of the third party website or any customer of the service to understand who their biggest influencers are based on the hierarchy incorporated within each of the each of the RefIDs 405/505. The retailer of the third party website or any customer of the service can understand who referred a product to whom (e.g., Sally referred to Joseph via SALSHARE!NA1001JPH), and so on down the line until a transaction or purchase was consummated (e.g., Rick took action from Joseph's share JOSSHARE1001RW$$$. Reverse path information could be invaluable to retailers who want to influence a similar set of customers for a future product. The retailer could opt to contact those influencers directly (e.g., direct target advertising) or give them sample products in order to facilitate further recommendations through social media.

FIG. 9 is a flow diagram illustrating a process 600 for modifying a social media link and tracking a chain of referrals in accordance with aspects of the present invention. At step 605, a user A activates a social media link. In embodiments, the social media link may pertain to a promotion or advertisement or a product or service that an action is taken on by user A, who is a member of a one or more social networks. The action performed by user A is an example of user activity on, for example, a third-party website or a social network page of one or more other users of the one or more social networks. In embodiments, the action may be user A clicking on the social media link, opening an email, accessing a quick response code (a QR code), scanning a bar code, etc.

At step 610, user A may choose to indirectly share (e.g., endorse) the social media link with one or more other users of the one or more social networks via a separate action such as forwarding an email or clicking on a social networking widget, e.g., "Share" or "Like" GUI button, or the action performed by user A on the social media link can directly trigger sharing or endorsement of the social media link with the one or more other users of the one or more social networks.

At step 615, when the social media link is shared with the one or more other users, program code is executed to look-up user A's authentication credential and collect unique identifier information for user A (e.g., an email address of the user). For example, through code and/or a widget (e.g., an application) embedded in the third-party website or the social network page, information regarding user A's activity (e.g., information identifying the user and the action performed) is collected.

At step 620, the information regarding user A's activity is transmitted to a web service with a request for a new referrer ID. For example, through the code and/or a widget (e.g., an application) embedded in the third-party website or the social network page, information regarding user A's activity (e.g., information identifying the user and the action performed) is transmitted to a computing device (e.g., computing device 130 described with respect to FIG. 4) with a request, e.g., a URL request, for a new referrer ID.

At step 625, the web service generates the new referrer ID based on the unique identifier information for user A, the action taken by user A, and unique identifier information for all previous users that have endorsed the social media link either by indirect or direct endorsement. For example, the URL request may include a referrer ID that can be expanded from a look-up table or hash table, as explained in further detail herein, to reveal a referral path for the social media link. The computing device (e.g., computing device 130 as described with respect to FIG. 4) can be configured to generate the new referrer ID.

At step 630, the generated new referrer ID is stored in a data storage device. For example, the generated new referrer ID is stored in the look-up table or hash table of the web service and/or the one or more social networks (e.g., data storage devices 135, 140, or 160 as described with respect to FIG. 4). At step 635, the generated new referrer ID is embedded in the social media link. For example, the generated new referrer ID is embedded in the URL of the social media link and forwarded to the one or more social networks (e.g., computing device 155 of one or more social networks 125 as described with respect to FIG. 4).

At step 640, the information regarding user A's activity is transmitted to the one or more social networks with a request for endorsement or promotional information. For example, through the code and/or a widget (e.g., an application) embedded in the third-party website or the social network page, information regarding user A's activity (e.g., information identifying the user and the action performed) is transmitted to a computing device (e.g., computing device 155 described with respect to FIG. 4) with a request for endorsement or promotional information.

At step 645, the endorsement or promotional information is created. In embodiments, the computing device (e.g., computing device 155 described with respect to FIG. 4) can create the endorsement or promotional information from a template provided by the third-party website or the one or more social networks. The template can contain placeholders for information regarding a user (user A) that has performed the action (e.g., consent to promote, product purchase, etc.) on the third-party website which triggered creation of the endorsement or promotional information. For instance, a template from which the endorsement or promotional information is created could be an image of a product or service with text with text recommending the product or service using the user's name (e.g., User A).

At step 650, the created endorsement or promotional information is stored in a data storage device. For example, the computing device (e.g., computing device 155 described with respect to FIG. 4) can store the created endorsement or promotional information in a data storage device (e.g., data storage device 160 described with respect to FIG. 4) for later retrieval. In embodiments, the created endorsement or promotional information is stored in association with the URL containing the generated new referrer ID from step 630.

At step 655, a request for the created endorsement or promotional information can be received from the one or more social networks and the created endorsement or promotional information can be retrieved and displayed to one or more users of the one or more social networks. For example, a request for the created endorsement or promotional information can be received (e.g., a request can be received at the data storage device 160 described with respect to FIG. 4) from the one or more social networks (e.g., computing device 155 described with respect to FIG. 4) to retrieve the created endorsement or promotional information. The retrieved endorsement and promotional information may be displayed (e.g., computing device 155 described with respect to FIG. 4 can be configured to cause the information to be displayed) within an activity stream, email, SMS message, a social network page (e.g., user's profile page, another user's profile page, a community page, etc.), etc. In embodiments, the created endorsement or promotional information is retrieved with the associated URL containing the generated new referrer ID and displayed in association with the URL.

At step 660, the steps of process 600 are repeated each time a user re-shares the social media link with one or more other users of the one or more social networks. At step 665, a request for information pertaining to the social media link can be received. For example, a host such as a retailer of the third party website may send a request for information such as a hierarchy tree or chain of influence for a particular user pertaining to the social media link to a web service (e.g., computing device 130 described with respect to FIG. 4).

At step 670, information pertaining to the social media link is generated and forwarded. For example, a hierarchy tree or chain of influence for a particular user associated with the social media link is generated using the data table (e.g., the look-up table or hash table of the web service and/or the one or more social networks such as data storage devices 135, 140, or 160 as described with respect to FIG. 4) comprising all the referrer IDs for the social media link. Once the information pertaining to the social media link is generated, the information is forwarded to the requesting party such as the a host of the third party website for their analysis.

In embodiments, the invention provides a method that performs the process of the invention on a subscription, advertising, and/or fee basis. That is, a service provider could offer to provide the tracking and measuring of the influence of social networking members. In this case, the service provider can create, maintain, support, etc., a computer infrastructure, such as computer system 12 (FIG. 1)

that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for tracking and measuring the influence of members on one or more social networks. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method implemented in a computer infrastructure having computer executable code tangibly embodied on a computer readable storage medium having programming instructions operable to:
   receive unique identifier information for a user that referred a social media link to one or more other users;
   generate a reference identifier for a referrer of the social media link to the one or more other users;
   embed the generated reference identifier into the social media link; and
   propagate endorsement information associated with the social media link to other users in a social network which have a relationship with the user in anticipation of the other users requesting a page of the social network,
   wherein the generated reference identifier includes a concatenation of the unique identifier information and information pertaining to referrals of the social media link prior to the refer to the one or more other users.

2. The method of claim 1, wherein the social media link is for an electronic commerce coupon, an electronic commerce advertisement, a product available for purchase through a third party website, or a service available for purchase through a third party website.

3. The method of claim 2, wherein the social media link is for a product or service available for purchase through a third party website.

4. The method of claim 3, wherein the generated reference identifier includes a concatenation of a portion of the unique identifier information, portions of activity information of the user, and portions of information pertaining to the referrals of the social media link prior to the refer to the one or more other users.

5. The method of claim 4, wherein the programming instructions are further operable to forward to the social media link comprising the generated reference identifier to one or more social networks.

6. The method of claim 5, wherein:
   the activity information for the user is used by the one or more social networks to create the endorsement information regarding the product or service; and
   the endorsement information is displayed to the one or more other users in association with the social media link comprising the generated reference identifier.

7. The method of claim 1, wherein the programming instructions are further operable to:
   save the generated reference identifier into a data table;
   receive a request for a hierarchy tree or chain of influence associated with the social media link; and
   generate the hierarchy tree or chain of influence using the generated reference identifier and the data table.

8. The method of claim 1, wherein a service provider at least one of creates, maintains, deploys and supports the computer infrastructure.

9. A computer program product on a computing device, the computer program product comprising a computer readable storage medium having program instructions embodied therewith, wherein the computer readable storage medium is not a transitory signal per se, and the program instructions are readable by a computing device to cause the computing device to perform a method comprising:
   receiving activity information for a member of one or more social networks that referred a social media link to one or more other members of the one or more social networks;
   generating a reference identifier for a referrer of the social media link to the one or more other members;
   embedding the generated reference identifier into the social media link; and
   propagating endorsement information associated with the social media link to the one or more other members in the one or more social networks which have a relationship with the member in anticipation of the other members requesting a page of the one or more social networks,
   wherein the generated reference identifier includes a concatenation of portions of the activity information and portions of information pertaining to referrals of the social media link prior to the refer to the one or more other members.

10. The computer program product of claim 9, wherein the social media link is for an electronic commerce coupon, an electronic commerce advertisement, a product available for purchase through a third party website, or a service available for purchase through a third party website.

11. The computer program product of claim 10, wherein the activity information includes transactional information pertaining to the referrer of the social media link to the one or more other members, information pertaining to the product or the service associated with the social media link, and information pertaining to a retailer that sells the product or service.

12. The computer program product of claim 11, wherein the method further comprises forwarding the social media link comprising the generated reference identifier to the one or more social networks.

13. The computer program product of claim 12, wherein:
the activity information for the user is used by the one or more social networks to create the endorsement information regarding the product or service; and
the endorsement information is displayed to the one or more other members in association with the social media link comprising the generated reference identifier.

14. The computer program product of claim 13, wherein the method further comprises:
saving the generated reference identifier into a data table;
receiving a request for a hierarchy tree or chain of influence associated with the social media link; and
generating the hierarchy tree or chain of influence using the generated reference identifier and the data table.

* * * * *